(12) United States Patent
Stanchev et al.

(10) Patent No.: US 12,358,502 B2
(45) Date of Patent: Jul. 15, 2025

(54) METHOD FOR TRAJECTORY PLANNING OF AN ASSISTANCE SYSTEM

(71) Applicants: Conti Temic microelectronic GmbH, Nuremberg (DE); Continental Automotive GmbH, Munich (DE)

(72) Inventors: Radoy Stanchev, Darmstadt (DE); Fabian Becker, Frankfurt (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 605 days.

(21) Appl. No.: 17/310,580

(22) PCT Filed: Jan. 16, 2020

(86) PCT No.: PCT/DE2020/200005
§ 371 (c)(1),
(2) Date: Aug. 12, 2021

(87) PCT Pub. No.: WO2020/164670
PCT Pub. Date: Aug. 20, 2020

(65) Prior Publication Data
US 2022/0176958 A1   Jun. 9, 2022

(30) Foreign Application Priority Data
Feb. 12, 2019 (DE) ............. 10 2019 201 800.9

(51) Int. Cl.
*B60W 30/14* (2006.01)
*B60W 30/16* (2020.01)

(52) U.S. Cl.
CPC .......... *B60W 30/143* (2013.01); *B60W 30/16* (2013.01); *B60W 2554/802* (2020.02);
(Continued)

(58) Field of Classification Search
CPC ............. B60W 30/143; B60W 30/16; B60W 2554/802; B60W 2554/804;
(Continued)

(56) References Cited

U.S. PATENT DOCUMENTS 7,702,427 B1 * 4/2010 Sridhar .................. G08G 5/045
701/16
9,448,546 B2 * 9/2016 Sayyarrodsari ...... G05B 13/047
(Continued)

FOREIGN PATENT DOCUMENTS

CN   102481932 A   5/2012
CN   105189255 A   12/2015
(Continued)

OTHER PUBLICATIONS

Chinese Office Action dated Jun. 29, 2023 for the counterpart Chinese Patent Application No. 202080012725.6 and DeepL translation of same.
(Continued)

*Primary Examiner* — Tuan C To
*Assistant Examiner* — Dominick Mulder (57) ABSTRACT

The disclosure relates to a method for trajectory planning of a driver assistance system, particularly an assistance system for longitudinal and/or transverse control, in which a trajectory having a total duration which can be set is determined and the trajectory is divided into segments, wherein each segment has a variable segment duration and the total of the segment durations corresponds to the set total duration of the trajectory.

19 Claims, 5 Drawing Sheets

(52) U.S. Cl.
CPC . *B60W 2554/804* (2020.02); *B60W 2720/103* (2013.01); *B60W 2720/106* (2013.01)

(58) Field of Classification Search
CPC ..... B60W 2720/103; B60W 2720/106; B60W 30/165; B60W 50/06; B60W 30/17
USPC .......................................................... 701/96
See application file for complete search history.

(56) References Cited

U.S. PATENT DOCUMENTS

| | | | |
|---|---|---|---|
| 2005/0165507 A1* | 7/2005 | Shimizu | B62D 57/032 700/245 |
| 2006/0149780 A1* | 7/2006 | Joshi | G06F 16/29 707/999.102 |
| 2009/0259363 A1* | 10/2009 | Li | B60W 50/0097 180/65.265 |
| 2010/0073044 A1* | 3/2010 | Cornelius | H03L 7/00 327/145 |
| 2012/0035828 A1 | 2/2012 | Yamanaka et al. | |
| 2012/0109510 A1 | 5/2012 | Ota et al. | |
| 2013/0253797 A1* | 9/2013 | Mcnew | B60W 30/143 701/1 |
| 2014/0336844 A1 | 11/2014 | Schwindt et al. | |
| 2015/0298699 A1 | 10/2015 | Denner | |
| 2016/0023649 A1* | 1/2016 | Muller | B60W 20/13 701/22 |
| 2016/0363456 A1* | 12/2016 | Pujos | G01C 21/3697 |
| 2017/0145940 A1* | 5/2017 | Ohisa | F02D 41/021 |
| 2017/0232966 A1* | 8/2017 | Ishioka | B60W 50/082 701/96 |
| 2017/0277192 A1 | 9/2017 | Gupta et al. | |
| 2018/0129214 A1 | 5/2018 | During et al. | |
| 2018/0194354 A1* | 7/2018 | Takeda | G05D 1/0253 |
| 2018/0244270 A1* | 8/2018 | Tudosie | B60W 30/143 |
| 2019/0086930 A1* | 3/2019 | Fan | B60W 30/12 |
| 2019/0179330 A1* | 6/2019 | Oniwa | B60W 30/10 |
| 2019/0227546 A1* | 7/2019 | Sato | G05D 1/0061 |
| 2019/0283591 A1* | 9/2019 | Koebler | G01C 21/3469 |
| 2020/0241541 A1* | 7/2020 | McCawley | B60W 30/16 |
| 2020/0317194 A1* | 10/2020 | Yan | B60W 30/12 |
| 2020/0398838 A1 | 12/2020 | Oguro et al. | |
| 2021/0173402 A1* | 6/2021 | Chang | B60W 30/18163 |
| 2021/0331676 A1* | 10/2021 | Wu | B60W 50/00 |

FOREIGN PATENT DOCUMENTS

| | | |
|---|---|---|
| CN | 107567405 A | 1/2018 |
| CN | 108780610 A | 11/2018 |
| CN | 109177972 A | 1/2019 |
| DE | 102012213321 A1 | 1/2014 |
| DE | 102015221612 A1 | 5/2017 |
| DE | 102017200580 A1 | 7/2018 |
| GB | 2547991 A | 9/2017 |
| JP | 2001154733 A | 6/2001 |
| WO | 2010113319 A1 | 10/2010 |
| WO | 2011025443 A1 | 3/2011 |
| WO | 2011036855 A1 | 3/2011 |
| WO | 2019003302 A1 | 1/2019 |
| WO | 2019020354 A1 | 1/2019 |

OTHER PUBLICATIONS

Chinese Notice of Grant of a Patent for Invention dated Oct. 8, 2023 for the counterpart Chinese Patent Application No. 202080012725.6 and DeepL translation of same.

Japanese Notice of Reasons for Refusal dated Jul. 29, 2022 for the counterpart Japanese Patent Application No. 2021-537116.

International Search Report and the Written Opinion of the International Searching Authority mailed on May 8, 2020 for the counterpart PCT Application No. PCT/DE2020/200005.

Gorjestani, A.; Shankitz, C. Donath, M.: Impedance control for truck collision avoidance. In: Proceedings of the 2000 American Control Conference, Jun. 28-30, 2000, Chicago, IL, USA, 2000, S. 1519-1524.

Best Graeme et al, Path Planning with Spatiotemporal Optimal Stopping for Stochastic Mission Monitoring IEEE Transactions on Robotics, IEEE Service Center, Piscataway, NJ, US, bd, 33, Nr. 3, 1. Jun. 2017 (Jun. 2017), Seite 629-646, XP011652L49.

Blackwell, "Particle Swarm Optimization in Dynamic Environments", Department of Computing, Goldsmiths College London SE14 6NW, UK.

Bengtsson, "Adaptive Cruise Control and Driver Modeling", Lund Institute of Technology (LTH), Nov. 2001, ISSN 0280-5316.

German Search Report dated Dec. 2, 2019 for the counterpart German Application No. 10 2019 201 800.9 machine translation.

Rathgeber, Christian: Trajektorienplanung und -folgeregelung fur assistiertes bis hochautomatisiertes Fahren. Berlin, 2016. pp. 34, 35, 59, 53-58, 87, and machine translation.

Werling, Moritz: Ein neues Konzept fur die Trajektoriengenerierung und -stabilisierung in zeitkritischen Verkehrsszenarien. Karlsruhe: KIT Scientific Publishing, 2011 (Schriftenreihe des Instituts fur Angewandte Informatik—Automatisierungstechnik, Karlsruher Institut fur Technologie; 34). 168 S machine translation.

Werling, et al; "A Multi Controller for Testing Full-autonomous Driving", Nov. 2008 at—Automatisierungstechnik 56(11) machine translation.

European Examination Report dated Mar. 25, 2024 for the counterpart European Patent Application No. 20 707 559.9 and machine translation of same.

European Examination Report dated Jun. 11, 2025 for the counterpart European Patent Application No. 20 707 559.9 and machine translation of same.

\* cited by examiner

Fig. 1

(Prior art)

METHOD FOR TRAJECTORY PLANNING OF AN ASSISTANCE SYSTEM

TECHNICAL FIELD

The technical field relates generally to a method for trajectory planning of an assistance system for a means of transportation or a vehicle, and more particularly a driver assistance system for longitudinal and/or transverse control, as well as a trajectory planner.

BACKGROUND

Modern means of transportation such as, e.g., vehicles, bicycles, motorcycles, airplanes, drones, watercraft, boats and the like are increasingly being equipped with assistance systems or driver assistance systems. Particularly in the field of vehicle technology, recognizing road users or other vehicles, pedestrians and the like as well as detecting or estimating lane markings (e.g., road boundaries or road markings) are elementary functions in modern driver assistance systems and are deployed, e.g., in the case of transversely and longitudinally controlling assistance functions (lateral and longitudinal functions) such as, e.g., in the case of Adaptive Cruise Control (ACC) or Automatic Distance Regulation (ADR), lane keep assist (LKA) or emergency brake assist (EBA). For example, the trajectory to be driven or the movement path of the respective means of transportation or vehicle can be determined therewith. Static targets or objects can be detected by means of suitable sensors, as a result of which, e.g., the clearance with respect to a vehicle driving ahead or the course of the road can be estimated. For example, radar, lidar or camera sensors can be deployed for object recognition.

Generic control concepts for assistance systems are based, e.g., on trajectory planning by means of optimization. Further, such assistance systems frequently have restricted computing resources, e.g., on a (radar) control unit, and should therefore be deployed in conjunction with efficient optimization methods. To this end, WERLING (in Werling, Moritz: "Ein neues Konzept für die Trajektoriengenerierung und-stabilisierung in zeitkritischen Verkehrsszenarien" ["A new concept for generating and stabilizing trajectories in time-critical traffic scenarios" ], KIT Scientific Publishing, Karlsruhe, 2011) and RATHGEBER (in Rathgeber, Christian: "Trajektorienplanung und-folgeregelung für assistiertes bis hochautomatisiertes Fahren" ["Trajectory planning and follow-up control for assisted to highly automated driving" ], Technical University of Berlin, 2016), for example, propose the analytical solution of a simplified optimal control problem. For this purpose, all of the restrictions (e.g., jolt and acceleration) are initially disregarded in a first step and the end time as well as the final condition of the trajectory are assumed to be known. Third-order to seventh-order polynomials are produced as solutions for the trajectories. The search space spanned by the end time and final speed or end position is subsequently rasterized and a trajectory calculated for each raster point. A quality measure is calculated for each trajectory. The quality measure is a criterion for evaluating the trajectories, wherein, e.g., the course of the acceleration can be evaluated. In a second step, the trajectories are checked for violations of the restrictions and, if applicable, are excluded from the quantity of valid trajectories. The trajectory having the lowest quality measure from the remaining trajectories is then the result of the optimization. By virtue of the description of a trajectory by a single polynomial as in the case of WERLING, the limits of the acceleration can only be achieved selectively. RATHGEBER therefore proposes three-part trajectories: building, holding and reducing the acceleration which each have a polynomial. However, the trajectories for building and reducing the acceleration have a fixed duration, which can result in situational disadvantages in practice. Moreover, specific function extensions of a generic assistance system (e.g., ACC) are not taken into account, e.g., for polynomial-based trajectory planning.

GORJESTANI et al. (in Gorjestani, A.; Shankwitz, C. and Donath, M.: "Impedance Control for Truck Collision Avoidance"; In: Proceedings of the American Control Conference, 2000) further describe a virtual bumper for implementing distance regulation.

DE 10 2017 200 580 A1 describes a method for optimizing maneuver planning of a vehicle. In order to perform the method, the method comprises a planning level which is subdivided into at least three different abstraction levels for all the planning layers of the planning level. Continual planning and semantic information are combined by grouping multiple established maneuver options. The success of each maneuver option is further evaluated, incorporating inconsistencies in the conduct of other road users in order to select the best strategy for performing the maneuver.

It is desirable to present an improved method for trajectory planning of an assistance system as well as an improved assistance system, in which the disadvantages of the prior art are overcome. Other desirable features and characteristics will become apparent from the subsequent summary and detailed description, and the appended claims, taken in conjunction with the accompanying drawings and this background.

BRIEF SUMMARY

In the case of the proposed method for trajectory planning of a driver assistance system, particularly a longitudinally and/or transversely controlling system (e.g., ACC, ADR, EBA, LKA system or the like), at least one trajectory having a total duration which can be set is initially determined, which is divided into segments, preferably into three segments. Each of the segments has a variable segment duration, wherein the total of the respective segment durations corresponds to the previously set total duration of the trajectory, i.e., whilst the individual segment durations are embodied in a changeable or variable manner, the total duration or total length of the trajectory remains unchanged. An extension of the basic functionality of the respective assistance system can also be made possible in a simple way, e.g., in order to achieve a specific function extension such as predictive speed adjustment during cornering, predictive speed adjustment for detected traffic signs, supporting the overtaking process by accelerating and/or preventing overtaking in the "slower lane", e.g., during overtaking maneuvers on the right on highways.

During the dividing of the trajectories, a first segment for building the acceleration, a second segment for holding the acceleration and a third segment for reducing the acceleration can be provided in a simple manner. Further, these segments can also be divided in each case into further subsegments, and/or can have segments beforehand, thereafter and/or therebetween. In particular, the segments for building and reducing the acceleration should not have a fixed segment duration so that these can be adapted to the respective situation in a simple manner. As a result, the flexibility and deployability of the entire system are improved to a particular extent.

The accelerations in the building and in the reducing segments of the trajectory are in each case preferably described by a third-order polynomial for speed control. This results in the advantage that such a description or calculation can be implemented particularly easily.

It is particularly expedient if the segment duration of the respective segments is set based on a quality measure. For example, this quality measure can be chosen such that it corresponds to the integral portion of the quality measure for evaluating a one-part trajectory, which makes it possible inter alia to replace a one-part trajectory directly with a three-part trajectory.

The segment duration of the first segment can further be determined as a function of the segment duration of the third segment or vice versa, i.e., the segment duration of the first segment can be determined, e.g., by means of a quadratic equation as a function of the segment duration of the third segment.

A three-part trajectory can be expediently calculated for a distance regulation, in which the first and second segments correspond to the segments of the speed control, whilst the third segment is described by a polynomial of another order, particularly a fifth-order polynomial, so that the trajectory converts the system into the desired final condition (acceleration, speed and position).

The segment duration of one or more of the segments is preferably chosen in such a way that the quality measure of the three-part trajectory becomes minimal or is decreased.

It has proven to be particularly advantageous if a subordinate optimization is provided for selecting the segment duration of one or more of the segments. As a result, the selection is simplified even further.

The trajectory can be expediently planned by varying the total duration of the respective trajectory.

An adaptive search space having raster points for determining a trajectory can further be provided, wherein the target conditions of the trajectories in the search space are chosen based on a displacement of the raster points, particularly as a result of the raster points being displaced towards the optimal trajectory, i.e., a concentration of the raster points displays the optimal trajectory.

The raster points are preferably adapted iteratively over multiple time steps, i.e., the points in time can be varied or adapted based on an iterative procedure (over multiple time steps).

A spring-damper system or a mass-spring-damper system can be expediently provided, which serves to generate constant and consistent nominal conditions (path, speed and acceleration) of the means of transportation, which represent the points in time of the trajectory and/or braking movement planning.

According to a particular configuration of the method, a spring-damper system can be arranged in a situation-specific manner (e.g., in the range close to a standstill) as a virtual bumper between the means of transportation and a means of transportation driving ahead in addition to the trajectory planning for a distance regulation. The dynamics of the virtual bumper can be defined by the clearance which can be set between the means of transportation (e.g., ego vehicle and vehicle driving ahead), the speed, the acceleration, the mass of the means of transportation and/or the (virtual) spring travel.

At least one acceleration and/or speed plateau can be expediently provided as a buffer for any control deviations that occur. For example, an acceleration plateau can be provided before the means of transportation comes to a standstill which specifies the possible target condition region for the trajectory planning. Starting from the plateau, the means of transportation can be brought to a standstill in a defined (or controlled) manner in order to bring about gentle acceleration processes familiar to the driver during the stopping process (e.g., slow deceleration). As a result, e.g., abrupt and unwanted braking maneuvers can be avoided.

A trajectory planner can be expediently provided for determining the trajectory. For example, such a trajectory planner can be embodied as a hardware or software module so that the respective system can be pre-assembled in a simple way by the factory.

In a practical way, the trajectory planner comprises multiple modules and/or levels. These can, e.g., have a fixed configuration, have a modular design for ease of replacement and/or can be added so that the respective functions of the individual modules and levels can be chosen in a manner specific to the user or function. As a result, the range of functions and the preconfigurability of the respective trajectory planner are simplified to a particular extent, meaning that costs and time in particular can be saved.

The trajectory planner can further comprise a coordination level for specifying a target condition in a situation-specific and function-specific manner and a planning level for determining a trajectory based on the target condition. Further, the coordination level and/or the planning level can also have a modular construction. For example, the coordination level can comprise a speed module for adjusting the speed, and a distance assistance module for adjusting the distance or the section or route. In the same way, the speed module can, e.g., also comprise further modules for function design or function architecture such as, e.g., a speed control module, a speed limit assistance module and/or a cornering assistance module. Further, the planning level can also have a modular construction and comprise individual modules such as, e.g., a speed planner and/or a distance planner. Further, a trajectory selection module can also be provided for selecting the respective trajectory, which can be provided as the module of one of the levels or as separate levels. In addition, the entire coordination level or the distance module can also comprise further modules or subordinate modules. The listed modules merely represent a non-exhaustive selection of possible modules. However, other unnamed (sub) modules which comprise, e.g., further functions for trajectory planning known from the prior art are expressly comprised. This results in the advantage that intuitive and simple parameterization or application is made possible. In addition, scalability in terms of computing power of the respective system and the range of functions is improved to a particular extent. Such a modular construction makes it possible, e.g., to perform separate parameterization and application of individual functionalities within the coordination level utilizing the same planner architecture. This creates a simple possibility for expanding the system (including subsequently, e.g., in the form of an upgrade) in order to expand future functionalities.

The method can be implemented as an algorithm in a practical and simple manner. This results in the advantage that it can be implemented in new systems in a particularly simple and inexpensive manner. In addition, existing systems can be retrofitted in the same way.

Also presented is a trajectory planner for a corresponding assistance system or driver assistance system, which is particularly designed in such a way that the trajectory is planned utilizing the method described herein. A coordination level for adjusting a target condition, a planning level for determining a trajectory based on the target condition and a trajectory selection module for selecting the respective trajectory are provided.

Also presented is an assistance system or driver assistance system for a means of transportation, particularly an assistance system for longitudinal and/or transverse control (e.g., ACC, LKA or EBA system) which is characterized, inter alia, in that the assistance system performs trajectory planning by means of the method described herein and/or comprises a trajectory planner.

Hence, a new control concept for trajectory planning for assistance systems can be provided by the method described jereom, which serves to supersede the approaches previously used. As a result, the present invention represents a very special contribution to the field of driver assistance functions. The present invention also expressly comprises combinations of features of the subclaims which are not individually described.

BRIEF DESCRIPTION OF THE DRAWINGS

The invention will be explained in greater detail below with reference to expedient exemplary embodiments, wherein.

DETAILED DESCRIPTION

Exemplary embodiments for calculating multi-part trajectories are described below. A trajectory converts the system condition from its initial value into a defined final value. The system condition is described by the position s, the speed v, the acceleration a, and, depending on the system model, by the jolt r. The vehicle is modelled by a point mass for the trajectory calculation. In particular, a multi-step integrator chain is, as a general rule, used as a system model. The trajectory calculation represents an optimization problem which can be solved analytically according to the prior art. However, such solutions, as a general rule, describe the system conditions by polynomials which have the disadvantage that they can only reach the maximum values of jolt and acceleration on a point-by-point basis and cannot be kept constant in sections.

Figure 1:
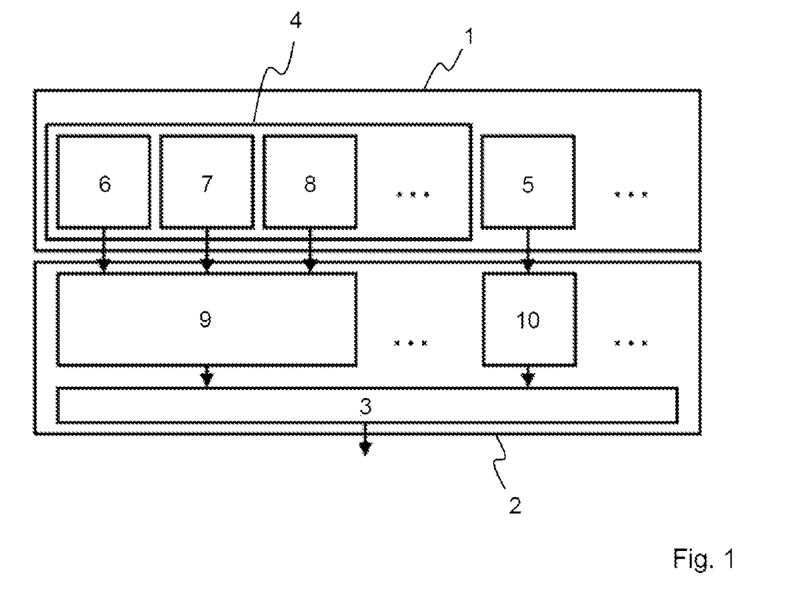
FIG. 1 shows a simplified schematic diagram of a configuration of a structure of a trajectory planner according to one exemplary embodiment.

An exemplary embodiment of a structure of a trajectory planner according to the invention for a driver assistance system is depicted in FIG. 1. Such a trajectory planner can, however, be expressly utilized for assistance systems of other means of transportation (flying objects, watercraft and the like). The trajectory planner comprises a coordination level 1 (or coordination layer) and a planning level 2 (or planning layer). Whilst the planning level 2 universally optimizes and calculates trajectories for converting the vehicle from its current actual condition into a desired target condition, the coordination level 1 provides an interface for situation-specific and function-specific adjustment of the target condition, the optimization criteria and restrictions of the trajectory planning.

Due to the various optimization goals for traveling on a clear section of road without a target object (speed trajectory) and for following a vehicle with a target object (distance regulation), the planning level 2 consists of a planner for speed trajectories (speed planner 9) and one or more (multi-object ACC) planners for distance trajectories (clearance or route planner 10). So-called traveling on a clear section of road designates the process of a vehicle driving and its own lane being clear or no vehicle driving ahead being established as a relevant target object, meaning that the vehicle is able to drive in an unimpeded manner at a target speed adjusted by the driver. If, however, a vehicle driving ahead which prevents the vehicle traveling on a clear section of road is established by, e.g., an assistance system, the speed can be controlled accordingly and adapted to the speed of the vehicle driving ahead. Correspondingly, this process involves so-called following a vehicle, in which the speed is, as a general rule, adjusted based on a nominal clearance which can be set with respect to the vehicle driving ahead. In order to change between the trajectories for traveling on a clear section of road and following a vehicle, a trajectory selection module 3 is linked to the different planners. The trajectories can be selected on the basis of the current trajectory acceleration. Alternatively, the trajectories can also be selected based on the complete trajectories.

The coordination level 1 may have a modular construction and contains an independent module or multiple independent modules such as, e.g., a speed module 4 and a distance assistance module 5 for each delimitable functionality of the system. Each module provides an intuitive interface with the application of the respective functionality. For this purpose, the respective module translates and reduces the plurality of optimization parameters of the actuated trajectory planner (weightings in the quality measure, condition restrictions, search space boundaries) to a few parameters in order to parameterize the respective functionality in a targeted manner. More complex algorithms are also conceivable, which control the behavior in complete scenarios. The modules can likewise have a modular construction and comprise subordinate functions or modules. As depicted by way of example in FIG. 1, the speed module 4 comprises at least three further (subordinate) modules: a speed control module 6, a speed limit assistance module 7, as well as a cornering assistance module 8. The individual modules consequently offer an intuitive interface with the situation-specific application of the subordinate planners and, thus, of the resulting trajectories or the desired trajectories. The plurality of optimization parameters of the trajectory planning (e.g., weightings in the quality measure, condition restrictions, choice of search space) are not released directly for the application since the function modules of the coordination level 1 initially translate and reduce the application task to a few plausible parameters in order to adjust the desired trajectory behavior in a targeted manner.

The coordination level 1 further offers the possibility of arbitrating in advance between different functionalities, or the coordination level 1 can assume the arbitration between different functionalities. For example, the requirements and target conditions of functions for controlling the speed without a target object (e.g., on the basis of a driver specification, predictive traffic sign recognition or predictive curve recognition) can be compared in advance so that, e.g., only the most critical requirement for speed trajectories are forwarded to the speed planner 9.

The arbitration between safety and comfort functions can also be carried out in the same way. For example, an EBA requirement can constantly override an ACC requirement, i.e., the respective functions can be prioritized for safety-critical viewpoints. On the other hand, it may be necessary in the case of distance regulation to calculate multiple planners for distance or clearance trajectories in parallel since multiple target objects are frequently located in the immediate vehicle environment (in front of or on the adjacent lanes) and it is not always the case that the most critical object is known in advance and can be selected for planning. One such example is a scenario in which overtaking on the "slower lane" ("overtaking on the right maneuver") with target objects in the vehicle's own lane and the adjacent lane is to be prevented. Here, the additional planners for distance trajectories can be designed, if possible, more simply (e.g., by means of a limited/coarser rasterization of the search space) than the main planner which is optimized for maximum comfort, e.g., with an increasing number of relevant objects, in order to limit the resource requirements.

Figure 2:
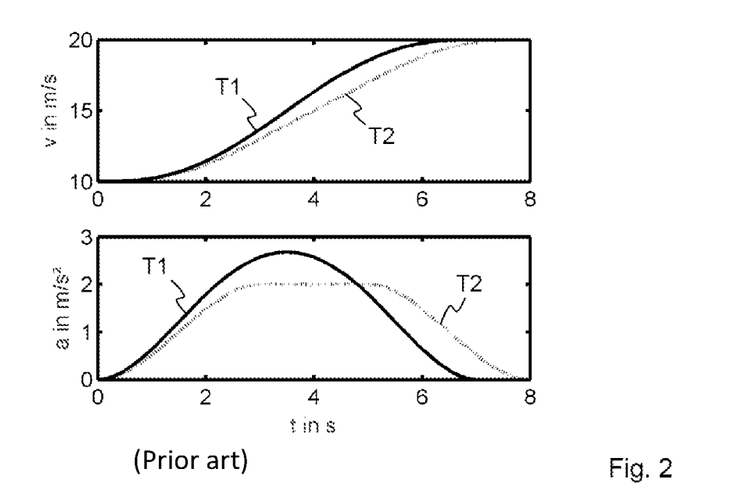
FIG. 2 shows a simplified diagram of trajectories for traveling on a clear section of road according to the prior art.

FIG. 2 shows the speed v (top) and the acceleration a (bottom) of an exemplary one-part trajectory T1 for traveling on a clear section of road according to the prior art. In the present example, the speed is now to be increased from 10 m/s to 20 m/s, wherein an acceleration restriction of 2 m/s² is effective. Since the calculated one-part trajectory violates the acceleration restriction, it is classified according to the prior art as inadmissible and discarded. In order to make better use of the accelerating power of the vehicle, three-part trajectories can be deployed. Such a three-part trajectory T2 is depicted in FIG. 2 in addition to the one-part trajectory T1. Therein, the first trajectory segment guides the acceleration to the maximum or minimum value $a_{cst}$, the second segment keeps the acceleration constant and the third segment reduces the acceleration again. The duration for the first and third trajectory segments is kept constant and the duration of the second segment is varied in such a way that the desired final speed is achieved. The consequence of this is that the duration te of the three-part trajectory generally deviates from the duration of the one-part trajectory T1, as shown in FIG. 2. Comparing the one-part trajectory T1 and the three-part trajectories T2 is thus inconsistent, since the trajectory length is included in the quality measure. A further disadvantage follows from the invariant duration of the first and third trajectory segments which, as a result, cannot be adapted to the specific situation.

In contrast, the calculation of three-part speed trajectories is proposed having a variable duration of all of the trajectory segments while observing the total duration $t_e$. The duration of the respective segments follows due to the minimization of a quality measure. The quality measure evaluates the deployment of the control variable at the start of the route model or the integrator chain and corresponds in this respect to the integral portion of the quality measure for evaluating one-part trajectories. Due to the consistent trajectory duration and the consistent quality measure of one-part and three-part trajectories, these can be exchanged directly in the superimposed optimization.

To ensure that a three-part trajectory attains the specified speed change $v_e-v_0$, the following equation has to be met:

$$\int_0^{\Delta t_1} a_1 dt + \int_0^{\Delta t_2} a_{cst} dt + \int_0^{\Delta t_3} a_3 dt = v_e - v_0$$

Figure 3:
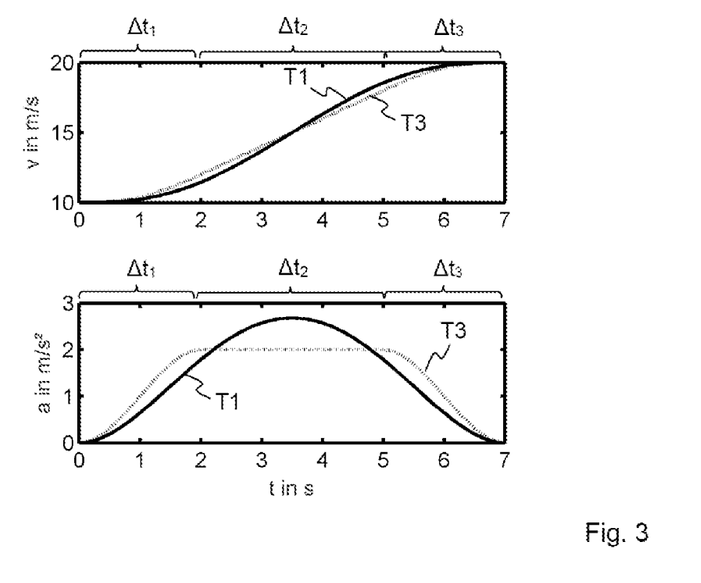
FIG. 3 shows a simplified diagram of a trajectory (dotted) within the meaning of the invention for the one-part trajectory from FIG. 2.
Figure 4:
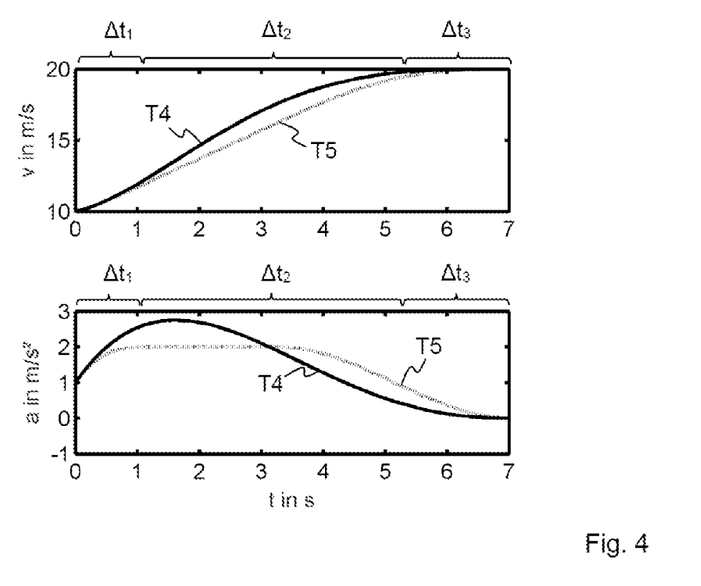
FIG. 4 shows a further simplified diagram of a trajectory planned according to one exemplary embodiment.

The total trajectory length $t_e$ corresponds to the total of the segment durations $\Delta t_1$, $\Delta t_2$ and $\Delta t_3$. The accelerations $a_1$ and $a_3$ in the first and in the third segments are described by third-order polynomials. The insertion of $a_1$ and $a_3$ in the above equation leads to the quadratic equation for $\Delta t_1$ $$a \cdot \Delta t_1^2 + b \cdot \Delta t_1 + c(\Delta t_3, t_e) = 0,$$

if $\Delta t_3$ and $t_e$ are assumed as parameters, i.e., $\Delta t_1$ can be calculated for meaningfully chosen values of $\Delta t_3$ and the resulting three-part trajectory has the required length $t_e$. It has been shown that, with two valid solutions for $\Delta t_1$, the smaller results in a smaller quality measure. The duration $\Delta t_3$ is chosen so that the quality measure of the three-part trajectory becomes minimal. A subordinate optimization is deployed for this purpose. In a first step, the possible solution range for $\Delta t_3$ is determined. Initially, this cannot be less than zero and not longer than the trajectory length $t_e$. Only real and positive solutions are possible for solving the quadratic equation for $\Delta t_1$, which leads to two inequations. A third inequation arises from the further demand that $\Delta t_2$ is to likewise be positive. In order to find the optimal $\Delta t_3$, a bisection method is deployed in a second step. This produces an optimal replacement for the one-part trajectory, which is consistent with the latter, after a few calculation steps. In FIG. 3, a three-part trajectory T3 is depicted for the example in FIG. 2. In FIG. 4, a further example is depicted, in which a non-symmetrical trajectory T5 is calculated as a replacement for the one-part trajectory T4.

The problem described above is also relevant in the case of path trajectories. Due to the higher order of the polynomials in path planning, a trajectory can, however, violate both the lower and the upper acceleration restriction. In such a case, the replacement trajectory has up to five trajectory segments and can no longer be calculated analytically. In practice, however, it is much more important that the lower acceleration restriction is exploited (e.g., access scenarios). In the event that only one acceleration restriction is exploited, a three-part path trajectory can be calculated in a similar way to the speed trajectory.

The first and the second trajectory segments $a_1$ and $a_{cst}$ are identical to the case of the speed trajectories, while the third segment converts the final condition to the desired final speed $v_e$ by a fifth-order polynomial. To ensure that a three-part trajectory bridges the specified distance $s_e - s_0$, the following equation has to be met:

$$\iint_0^{\Delta t_1} a_1 dt + \iint_0^{\Delta t_2} a_{cst} dt + \int_0^{\Delta t_3} v_3 dt = s_e - s^0.$$

Figure 5:
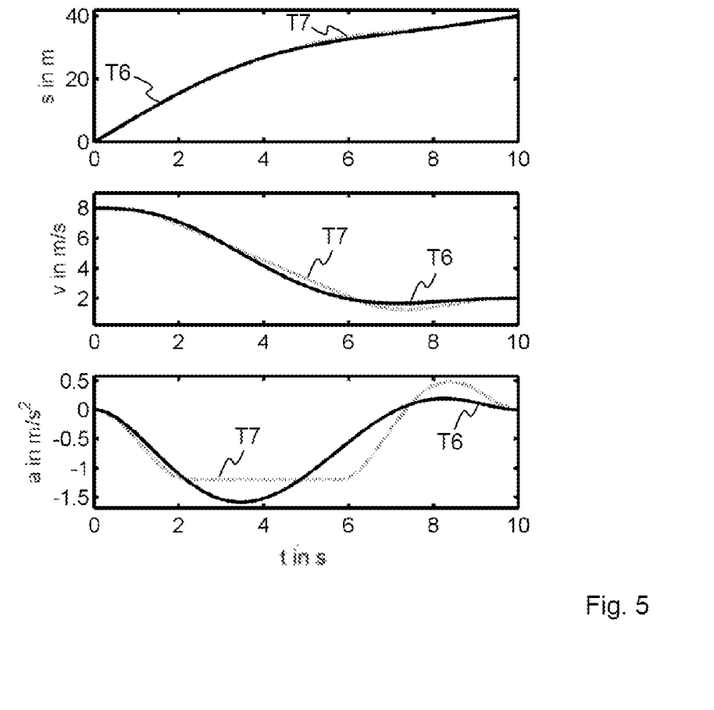
FIG. 5 shows a further simplified diagram of a trajectory planned according to one exemplary embodiment for distance regulation.

After inserting the acceleration $a_1$ and the speed $v_3$, this produces the quadratic equation for $\Delta t_2$ $$a \cdot \Delta t_2^2 + b(\Delta t_1, t_e) \cdot \Delta t_2 + c(\Delta t_1, t_e) = 0,$$

if $\Delta t_1$ and $t_e$ are assumed as parameters. In the case of the path trajectories, it no longer has to be decided in advance whether, in the case of two valid solutions for $\Delta t_2$, the smaller one also leads to a smaller quality measure. Therefore, both solutions have to be further investigated. The solution range of $\Delta t_1$ can be restricted by way of inequations. In FIG. 5, an exemplary embodiment for replacing a one-part path trajectory T6 with a three-part trajectory T7 is depicted (top path, middle speed and bottom acceleration): the three-part trajectory T7 (dotted) within the meaning of the invention stands, by way of example, for a trajectory having $r_0 = 0$ m/s³,
$a_0 = 0$ m/s²,
$v = 8$ m/s, $r_e = 0$ m/s³,
$a_e = 0$ m/s²,
$v_e = 2$ m/s and
$s_e = 40$ m.

An alternative possibility for planning multi-part path trajectories is produced by integrating three-part speed trajectories. A trajectory which approximates a one-part path trajectory, i.e., approaches a one-part trajectory, can be found by way of varying the trajectory end time and evaluating the resulting final clearance.

Target conditions for the trajectory planning can be further specified. The nominal clearance when following a vehicle can be determined based on the following equation:

$$d_w = d_{stop} + v_t \cdot \text{headway}.$$

Therein, $d_{stop}$ stands for the clearance with respect to the target vehicle when stationary, $v_t$ stands for the speed of the target vehicle and "headway" stands for the time gap. Furthermore, the movement of the target vehicle can be predicted in future, assuming a constant acceleration $a_{t,0}$:

$$a_t = a_{t,0}$$

$$v_t = v_{t,0} + a_{t,0} t$$

$$s_t = d_0 + v_{t,0} t + \tfrac{1}{2} a_{t,0} t^2.$$

The measured clearance is denoted by $d_0$. The nominal position $s_w$ of the ego vehicle results from the predicted position of the target vehicle and the nominal clearance, according to:

$$s_w = s_t - d_w = s_t - d_{stop} - v_t \cdot \text{headway}.$$

The remaining nominal conditions $v_w$ (speed) and $a_w$ (acceleration) can be calculated by differentiating this equation, e.g., by $$v_w = v_t - a_t \cdot \text{headway}$$

$$a_w = a_t.$$

Figure 6:
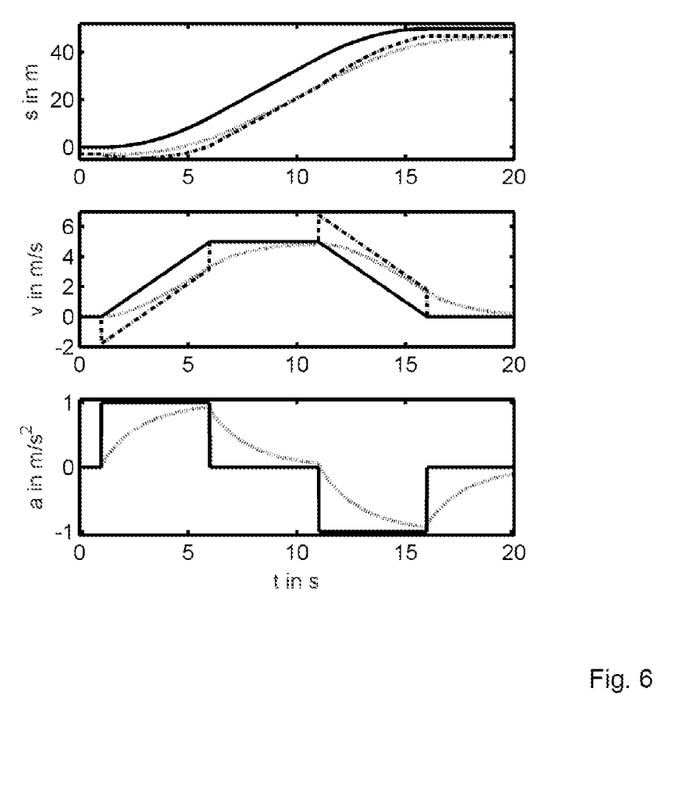
FIG. 6 shows a simplified diagram of a nominal condition specification when following a vehicle.

The courses of the conditions (path or distance (top), speed (middle) and acceleration (bottom)) of a target vehicle and the resulting nominal conditions are depicted in FIG. 6. The condition of the target vehicle is depicted in continuous black and the target conditions for the trajectory planning according to the clearance equation are depicted in dotted-dashed-black and following the filtering with a mass-spring-damper system (dashed line). In the event of a change in the acceleration of the target vehicle, the predicted nominal speed jumps by $-a_t *$ headway. Thus, at the start of a braking of the target vehicle (e.g., from 12 s to 17 s) a higher target speed than that of the target vehicle is rapidly required. As a consequence, the trajectory planning finds solutions which accelerate the vehicle in order to arrive at this higher speed, i.e., the vehicle is accelerated by the nominal clearance which is becoming smaller. Conversely, the nominal speed jumps to zero if the predicted target vehicle comes to a standstill. This jump in the nominal condition specification unfavorably results in the vehicle following a stopping or stationary target vehicle at too high a speed and with a small clearance. When the target vehicle moves off from a standstill, the nominal clearance increases again so that the nominal values for the planning lie at negative speeds for a while and would therefore push the stationary vehicle backwards.

Figure 7:
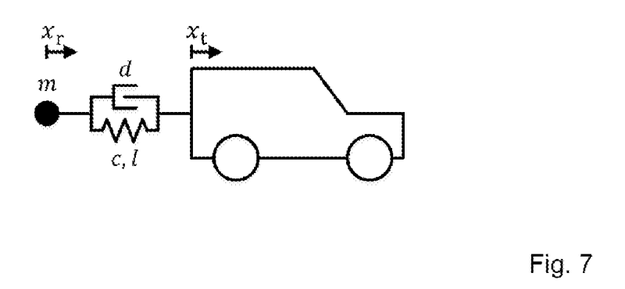
FIG. 7 shows a simplified diagram of a mass-spring-damper system for generating nominal conditions on a vehicle.

The insertion or provision of a virtual mass-spring-damper system arranged on the target vehicle represents one configuration of the method (FIG. 7). The nominal clearance dw corresponds to the spring length I, wherein c describes the spring constant. The condition $x_r$ of the mass m is used as a new nominal condition for the planning. This is a consistent filtering of the target vehicle condition in all conditions. The filtered nominal condition is depicted in FIG. 6. During braking of the target vehicle (from 12 s to 17 s), the target speed rises steadily to the nominal value without a jump. As a result, the specified clearance is slightly greater than the calculated nominal clearance and makes it possible to brake to a standstill, without the nominal speed and the nominal acceleration having inconsistencies. The invention also expressly comprises further configurations or interconnections of springs and dampers, which are not explicitly mentioned. Stability can be achieved in a convoy thanks to such a filtering.

A dynamic search space can also be expediently provided. How well the exact solution of the optimization problem is approximated by the calculated trajectory is determined by rasterizing the search space. Precise rasterization contrasts with low computing requirements. However, it is necessary in specific situations to rasterize very precisely in order to find a valid solution in the search space.

A disadvantage of a fixed and coarse rasterization is the non-continuous influence of the optimization parameters on the trajectory found. Parameter changes do not bring about a change in the trajectory until another raster point has a lower quality measure than the current raster point. This behavior makes application more difficult and prevents an intuitive course of action. Therefore, an adaptive search space is proposed. This is understood to mean that the raster points are displaced in such a way that more raster points are located in the vicinity of the best solution than in more remote areas. It is furthermore important that raster points are located in the entire search space so that it is possible to react very quickly to erratic changes in the target conditions (e.g., change in target object, strong target object braking, etc.). By iteratively adapting the raster points over multiple cycles of the optimization, it is possible to refine the rasterization about a selected point and to approach the optimum in this way. However, it can furthermore occur that no valid solution is found. The raster points can be focused statically or dynamically around the current solution. Genetic optimization represents another possibility. Here, solid, free charged and free uncharged particles are deployed. The solid particles delimit the search space, the free particles iterate towards the optimum and the charged particles cover a range around the solution. Here, each time step represents a generation. In a practical way, the particles do not concentrate on one point even after several hundred iterations. A displacement of the optimum which has taken place over time can be further considered during genetic optimization.

According to a further practical configuration of the invention, a "stop-and-go-function" can be provided, particularly for an ACC control. In a practical way, for such stop-and-go-functionality, the vehicle can follow a vehicle driving ahead right down to a standstill and move off again when the vehicle driving ahead moves off. The stopping process can be conveniently and reproducibly designed by defined "crawling" (i.e., continuing to move particularly slowly) just before coming to a standstill.

The previously described filtering of the target vehicle conditions generates nominal conditions which are preferably familiar to the driver. While the prediction of such target conditions has a jump to a negative target speed based on unfiltered target vehicle data when following a target vehicle moving off from a standstill, continuous nominal conditions with consistently positive target speed and target path specifications are produced with the present developed filtering of the target vehicle data. The same is also shown for an erratic change in the target vehicle acceleration (positive or negative) when following a vehicle normally (at speeds v>0 km/h).

When braking right down to a standstill behind a target vehicle it can happen that, due to too coarse a rasterization, there is no suitable target point in the quantity of target points. Too early a time requires stronger braking and too late a time leads to short-term reversing. Correspondingly, constantly varying target vehicle data and the resulting adaptation of the trajectories can lead to time steps, in which no suitable solution is found in the search space. As a general rule, this occurs during the last part of the braking just before coming to a standstill and leads to critical situations. In order to constantly guarantee a valid target point in the search space of the optimization, the raster points of the search space are varied adaptively, e.g., by a particle swarm. In combination with the filtering of the target vehicle data presented, this increases the robustness of the planning against changing target conditions and, in addition, improves the stopping behavior.

Furthermore, the stopping process is particularly difficult to adjust or regulate due to the lack of a possibility of "dipping in". Control deviations which occur (deviation between the planned and actual driven trajectory) cannot be easily corrected, as this would frequently require sections with negative speed (reversing). In order to compensate for the control deviations that occur, various extensions are conceivable and can improve the stopping behavior individually or in combination such as, e.g., by adapting the target conditions of the trajectory planning at low speeds and/or by applying a plateau of a constant acceleration and/or by blending the trajectory planning at very low speeds with a virtual bumper.

When an acceleration plateau is applied, the planning takes account of the fact that a defined intermediate condition is taken up before the final standstill. This guarantees safe moving off by representing a kind of buffer zone in which any control deviations which exist can be compensated particularly with respect to the distance from the target vehicle. The accurate conversion from the plateau to the standstill can be carried out, e.g., via a pre-controlled acceleration profile. An additional advantage of this approach is the possibility of applying a specific stopping behavior separately from the general trajectory planning.

Figure 8:
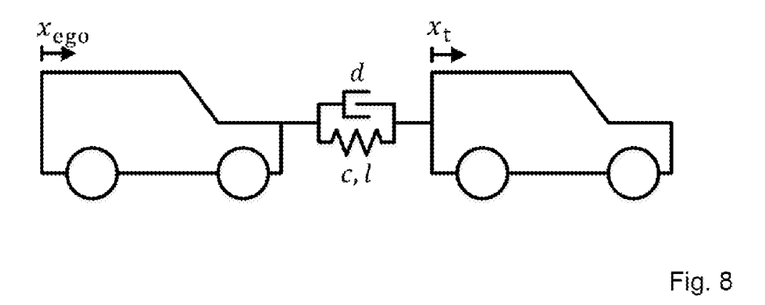
FIG. 8 shows a simplified diagram of a virtual bumper between an ego vehicle and a vehicle driving ahead.

A virtual bumper represents a spring-damper system which is virtually affixed or arranged between the vehicle ($x_{ego}$) and the target vehicle ($x_t$) (as depicted in FIG. 8). The result of designing this in a suitable manner is that the vehicle brakes down to a standstill at a specified clearance with respect to the target vehicle, follows at low speeds and can also move off behind the target vehicle. Thanks to the previous or preceding filtering of the nominal clearance, e.g., by means of a spring-damper system, suitable conditions can be created for the handover to the virtual bumper. The virtual bumper additionally offers a safe fallback level in the event that the primary planning does not find a trajectory in the solution range.

In summary, the modular construction of the coordination layer makes it possible to parameterize and apply individual functionalities separately utilizing the same planner architecture and, thus, makes it possible for the system to be extended by future functionalities in a simple manner. Building on the prior art, the concept of the three-part trajectory is renewed or extended: whilst, e.g., the edges of the acceleration trajectories have previously been fixed, they are now always chosen by a subordinate optimization in a way which is suitable for any initial and final conditions of the trajectory. Further, the trajectory planning is divided into two layers or levels, a coordination or parameterization layer and a planning layer in order to further increase the applicability in serial applications. Whilst the planning layer actually calculates trajectories for traveling on a clear section of road and following vehicles and switches over between these operating modes, the parameterization layer makes it possible to adjust the trajectory properties, e.g., by gain scheduling of the optimization parameters or the like, depending on the situation. The high relevance of the parameterization layer becomes particularly evident when considering human driving profiles. It is true that the optimization supplies trajectories which are optimal within the meaning of the quality measure, the course thereof can however sometimes be unfamiliar to a human driver in some situations, particularly because there is a discrepancy between the mathematical optimum of the trajectory courses and what is perceived to be the optimum by humans. For example, "full speed range ACC" can be provided, which is configured in such a way that a switchover is carried out between the trajectory planner according to the invention and another controller (e.g., the concept of the virtual bumper) in order to control the vehicle in an optimum manner, e.g., including at very low speeds (for example during stopping or crawling). Good dampening control behavior is important especially in a low-speed range in order to ensure, e.g., stability with an optimization-based ACC control concept in a convoy. Further, extensions of the basic functionality of the respective assistance system (e.g., ACC, EBA, etc.) can also be provided such as, e.g., preventing "overtaking on the right maneuvers" or braking before curves. The method can further be applied independently of the control structure of the respective means of transportation and consequently offers the possibility of considering the transverse movement of the means of transportation, e.g., an ACC system can consequently serve as a starting point for automated or autonomous driving.

LIST OF REFERENCE NUMERALS

T1 One-part trajectory (according to the prior art)
T2 Three-part trajectory (according to the prior art)
T3 Three-part trajectory
T4 One-part trajectory (according to the prior art)
T5 Three-part trajectory
T6 One-part trajectory (according to the prior art)
T7 Three-part trajectory
1 Coordination level
2 Planning level
3 Trajectory selection module
4 Speed module
5 Distance assistance module
6 Speed control module
7 Speed limit assistance module
8 Cornering assistance module
9 Speed planner
10 Distance planner

The invention claimed is:
1. A method for trajectory planning of an assistance system for longitudinal and/or transverse control of a vehicle, comprising:
    determining a trajectory having a total duration which can be set; and dividing the trajectory into segments, wherein each segment has a variable segment duration and a total of the segment durations corresponds to the total duration of the trajectory, wherein dividing the trajectory into segments comprises dividing the trajectory into a first segment, followed by a second segment, followed by a third segment, and wherein a duration of the first segment is determined using a quadratic equation as a function of a duration of the third segment or vice versa.

2. The method as set forth in claim 1 wherein dividing the trajectory into segments comprises dividing the trajectory into segments as a function of at least one of acceleration or speed.

3. The method as set forth in claim 1 wherein dividing the trajectory into segments comprises dividing the trajectory into a segment for building the acceleration, a segment for at least one of holding or altering the acceleration, and a segment for reducing the acceleration.

4. The method as set forth in claim 3 wherein the segment for building the acceleration and the segment for reducing the acceleration are described by a polynomial having an order of at least three.

5. The method as set forth in claim 1 further comprising setting the duration of each segment based on a quality measure.

6. The method as set forth in claim 1 wherein dividing the trajectory into segments comprises dividing the trajectory into a first segment, followed by a second segment, followed by a third segment, and in response to the vehicle following another vehicle, the first and second segments substantially correspond to traveling on a clear section of road while the third segment is described by a fifth-order polynomial so that the trajectory is converted into a desired final condition for acceleration, speed, and path.

7. The method as set forth in claim 1 further comprising choosing a segment duration of one of the segments in such a way that a quality measure of the trajectory becomes minimal.

8. The method as set forth in claim 1 further comprising providing a subordinate optimization for selecting the segment duration of at least one of the segments.

9. The method as set forth in claim 1 wherein determining the trajectory comprises varying the total duration of the trajectory.

10. The method as set forth in claim 1 further comprising providing an adaptive search space having raster points for predefining trajectory target conditions, and determining the trajectory is based on a displacement of the raster points such that the raster points are displaced towards the trajectory to be determined.

11. The method as set forth in claim 10 wherein the raster points are adapted iteratively over multiple time steps.

12. The method as set forth in claim 1 further comprising providing a spring-damper system for generating target driving conditions of the vehicle for following another vehicle.

13. The method as set forth in claim 12 wherein the spring-damper system is arranged as a virtual bumper between the vehicle and another vehicle driving ahead in order to regulate a distance, and a clearance is settable between at least one of the vehicle and the another vehicle, the speed, or spring travel of the spring-damper system are utilized.

14. The method as set forth in claim 1 comprising providing at least one of an acceleration or a speed plateau for compensating for control deviations.

15. The method as set forth in claim 1 further comprising providing a trajectory planner for determining the trajectory, wherein the trajectory planner comprises multiple modules and/or levels.

16. The method as set forth in claim 15 wherein the trajectory planner comprises a coordination layer for situation-specific and function-specific adjustment of a target condition and a planning layer for determining a trajectory based on the target condition, the coordination layer and the planning layer each comprising software executable on a vehicle controller.

17. A trajectory planner for an assistance system for longitudinal and/or transverse control of a vehicle, comprising:

a coordination layer for predefining a target condition;

a planning layer for determining a trajectory based on the target condition; and a trajectory selection module for selecting the respective trajectory, wherein the coordination layer, planning layer and trajectory selection module comprising software executable by a vehicle controller, and the trajectory planner is configured in such a way that the trajectory planning is performed by determining a trajectory having a total duration which can be set and dividing the trajectory into segments, wherein each segment has a variable segment duration and a total of the segment durations corresponds to the set total duration of the trajectory, and wherein dividing the trajectory into segments comprises dividing the trajectory into a first segment, followed by a second segment, followed by a third segment, and wherein a duration of the first segment is determined using a quadratic equation as a function of a duration of the third segment or vice versa.

18. The trajectory planner as set forth in claim 17, wherein the variable segment duration of each segment is changeable, but the total duration of the trajectory remains unchanged.

19. The method as set forth in claim 1, wherein the variable segment duration of each segment is changeable, but the total duration of the trajectory remains unchanged.

* * * * *